A. L. CARROLL.
SHOCK ABSORBING WHEEL.
APPLICATION FILED JULY 7, 1919.
1,350,642.
Patented Aug. 24, 1920.
3 SHEETS—SHEET 1.
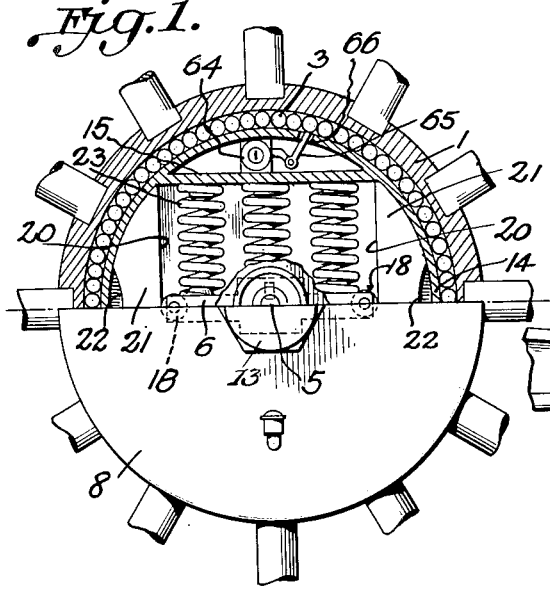
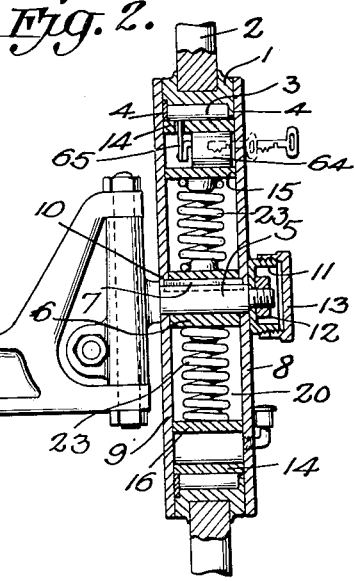
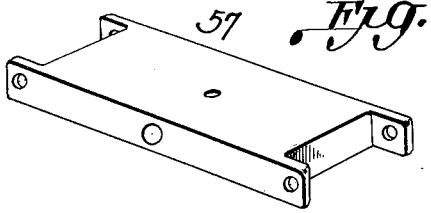
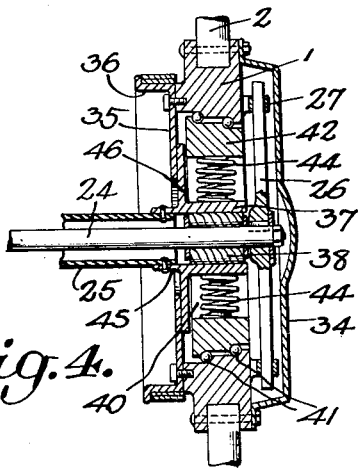
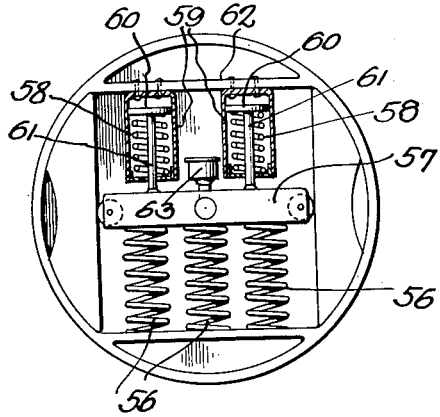
Inventor;
Andrew L. Carroll.
by, Losey & Lacy,
his Attys

A. L. CARROLL.
SHOCK ABSORBING WHEEL.
APPLICATION FILED JULY 7, 1919.

1,350,642.

Patented Aug. 24, 1920.
3 SHEETS—SHEET 2.

Inventor;
Andrew L. Carroll.
by Lacey & Lacey
his Atty's

A. L. CARROLL.
SHOCK ABSORBING WHEEL.
APPLICATION FILED JULY 7, 1919.

1,350,642.

Patented Aug. 24, 1920.
3 SHEETS—SHEET 3.

Inventor;
Andrew L. Carroll
by Lacey & Lacey,
his Attys.

UNITED STATES PATENT OFFICE.

ANDREW L. CARROLL, OF ST. LOUIS, MISSOURI, ASSIGNOR OF ONE-HALF TO GREGG McKENZIE, OF ST. LOUIS, MISSOURI.

SHOCK-ABSORBING WHEEL.

1,350,642.  Specification of Letters Patent.  Patented Aug. 24, 1920.

Application filed July 7, 1919. Serial No. 308,936.

*To all whom it may concern:*

Be it known that I, ANDREW L. CARROLL, a citizen of the United States, residing in the city of St. Louis and State of Missouri, have invented certain new and useful Improvements in Shock-Absorbing Wheels, of which the following is a specification.

The object of this invention is to provide means which may be applied to and housed within a wheel whereby a stationary support will be introduced at the center of the wheel and cushion devices interposed between said support and the outer rolling member of the wheel. The invention seeks to provide a device whereby the vibration imparted to a wheel by traveling over the ground and encountering irregularities in the surface of the same will be absorbed and the shock or jarring ordinarily experienced by the occupants of a vehicle will be overcome without the use of the costly pneumatic tire. The invention is designed primarily for use upon the wheels of automobiles but is applicable to the landing wheels of aeroplanes or to the wheels of other vehicles.

The invention is illustrated in the accompanying drawings, in which—

Figure 1 is a view, partly in section and partly in side elevation of a wheel embodying my improvements, the axle being relatively stationary;

Fig. 2 is a transverse section through the wheel shown in Fig. 1;

Fig. 4 is a transverse section through the central portion of the wheel shown in Fig. 3;

Fig. 5 is a detail view of the shock-absorbing portion of the wheel, showing some variations from the details shown in the preceding figures;

Fig. 6 is a detail perspective view of the rest shown in Fig. 5;

Figure 3:
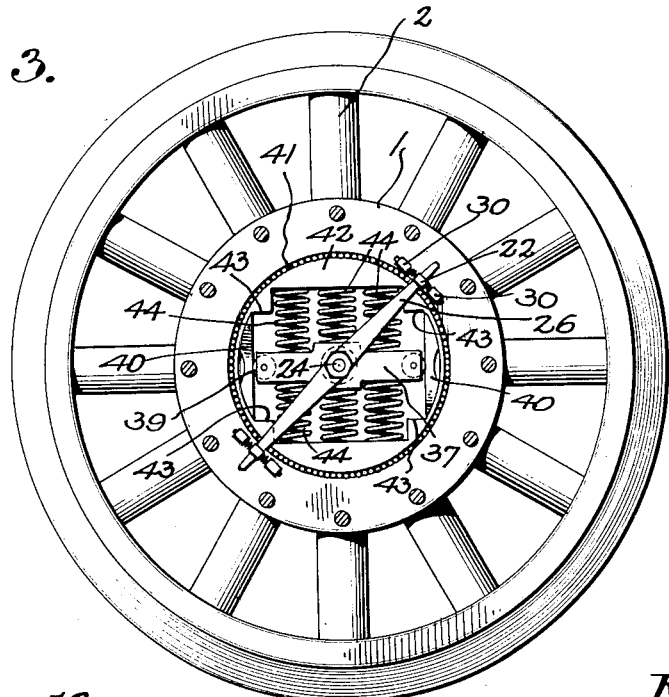
Fig. 3 is a view showing the application of the invention to a wheel to which power is applied through the axle.
Figures 12, 13:
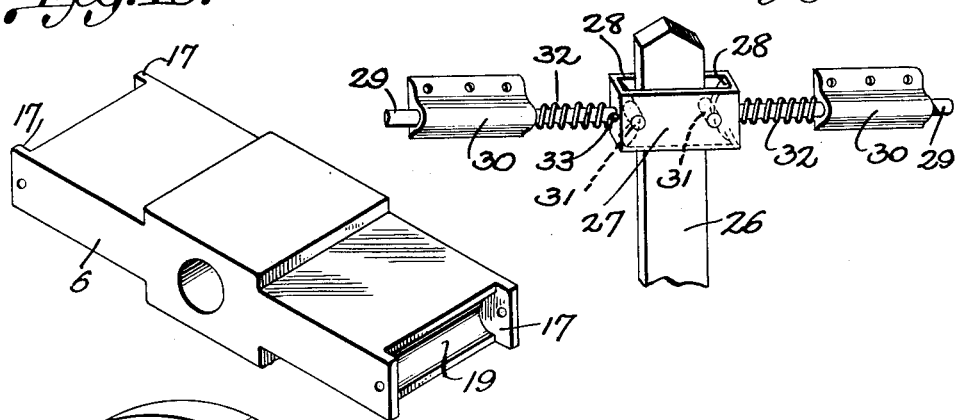
Fig. 12 is a detail view of the driving rod and associated parts employed in the form of wheel shown in Fig. 3.
Fig. 13 is a detail perspective view of one form of rest.
Figure 11:
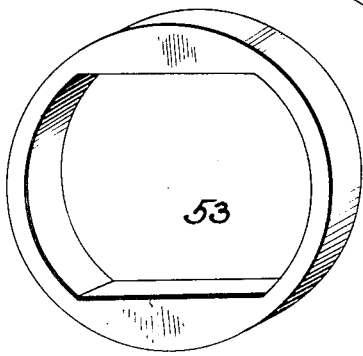
Fig. 11 is a detail perspective view of the inner hub member employed in applying the invention to a car wheel.
Figure 7:
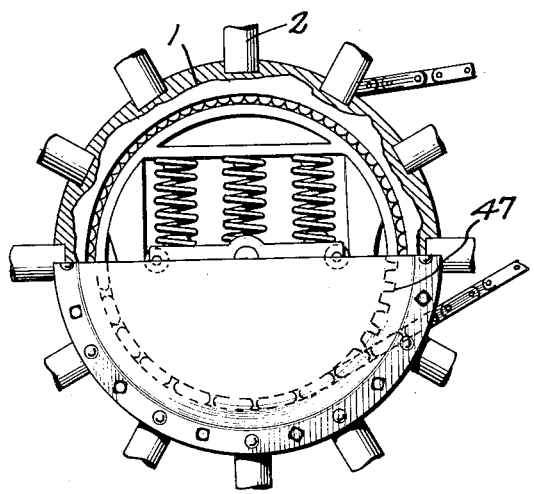
Fig. 7 is a view similar to Fig. 1, showing a chain-driven wheel.

In carrying out my invention, I employ an outer hub member 1 to which the spokes 2 of a wheel may be secured in any desired or preferred manner. This hub member is constructed at its inner periphery to receive anti-friction devices so that it may rotate easily about the inner hub member, said devices being shown in Figs. 1 and 2 as rollers 3 held between rings or flanges 4 projecting inwardly from the inner periphery of the outer hub member. The axle may be of any desired type, the one illustrated in Figs. 1 and 2, being the relatively stationary axle 5 of an automobile steering wheel. The axle 5 passes through a rest or support 6 and may, if preferred, be keyed thereto as indicated at 7. Covering plates or disks 8 and 9 are fitted upon the axle at the opposite sides of the rest, the latter plate or disk 9 being disposed between the inner side of the rest and the shoulder 10 on the axle and a box 11, axle nut 12, and cap 13 serving in an obvious manner to clamp the parts together and prevent the access of sand, dust or grit to the end of the axle. The disks or plates 8 and 9 extend past the outer hub member 1, as shown in Fig. 2, and thereby serve to guide the same in its relative vertical movements while preventing lateral displacement thereof and they also impart a neat finish to the wheel and protect the interior thereof from dust and dirt. The inner hub member 14 is a circular shell fitting to the rollers 3 and provided with a chordal plate or web 15 near its top and a similar web 16 near its bottom, the space below the web 16 being available as a reservoir for oil which may be permitted to flow to the rollers 3 for lubricating the same and the inner faces of the disks 8 and 9. At the ends of the rest 6 are perforated ears 17 to carry rollers 18 and the ends of the rest may be grooved, as at 19, to fit close to the rollers. Said rollers 19 run on the vertical inner faces 20 of bumper blocks 21 which are fitted within the shell 14 between the webs 15 and 16. These blocks are of rubber and serve not only as guides for the rest but also as cushions to break the force of sudden contact between the wheel and a large stone or other obstruction in the road. To facilitate the cushioning action of the bumper blocks, recesses 22 are formed in their outer arcuate faces. Coiled springs 23 are disposed above and below the rest 6 and are held by and between the same and the respective webs 15 and 16, being vertical at all times.

It will be readily understood that during the travel of the vehicle, the outer hub member 1 will rotate about the inner hub member 14 and the two hub members will move together vertically to accommodate the wheel to inequalities in the surface of the road, the springs yielding to such movement so as to absorb the shocks and keep the body of the vehicle on a constant level.

The axle 24 of an axle-driven wheel extends through a casing 25 and to its outer end I secure a radial arm or driving bar 26, the outer end of which passes through a loop or collar 27 upon the outer hub member of the wheel so that the rotation of the axle will be transmitted through the driving bar and the collar to the outer hub member 1 and the wheel thereby caused to rotate and travel over the ground. To accommodate relative angular movement of the driver in starting or stopping the vehicle, the collar or loop 27 is somewhat longer than the width of the driver and its end walls are beveled or flared, as indicated at 28, so as to permit the driver to assume an angular position within the guiding loop or collar without becoming released therefrom. Upon the outer hub member of the wheel at the opposite sides of the collar, I provide pins 29 which are slidably mounted in sleeves 30 secured to the hub, the said pins extending through the ends of the collar or loop and carrying rollers 31 which bear against the side edges of the driving arm. The pins are normally held projected toward the driver by springs 32 coiled around the pins between the sleeves 30 and stops 33 on the pins as will be readily understood. To the outer face of the hub member 1, I secure a cover plate 34 which extends over the driving arms and incloses all the parts so as to exclude dust therefrom. At the inner side of the wheel, is a cover plate 35 and a brake band rim or flange 36 may be formed on or secured to the said plate.

The axle 24 passes through a rest or supporting block 37 similar in form to the rest 6 but anti-friction bearings 38 are interposed between the bore of the block and the axle. The supporting block or rest remains in a horizontal position at all times and projects forwardly and rearwardly from the axle, its ends being equipped to accommodate rollers 39 which bear against the inner vertical walls of the bumper blocks 40, corresponding in all respects to the bumpers 21. In this form of wheel, illustrated in Figs. 3 and 4, ball bearings 41 are provided between the opposed surfaces of the inner and outer hub members. The inner hub member 42 is shown in these figures as having closed lower and upper portions with projections 43 at the ends thereof to retain the bumper blocks 40 in position and coiled springs 44 which serve to maintain the axle centrally disposed under normal conditions and will yield to vibrations of the wheel so that said vibrations will be absorbed and not transmitted to the body of the vehicle, are arranged above and below the rest or supporting block and bear against the upper and lower closed portions of the inner hub member. The supporting block or rest 37 is secured to the casing 25 in this application of the invention, the rest being provided with a boss 45 on its inner side to fit to the end of the casing and be bolted or otherwise secured thereto as will be readily understood. It will thus be seen that a relatively stationary support for the springs is provided and that the hub of the wheel will rotate about this support. Should the wheel encounter a large object so that an excessive vibration will be imparted thereto, the shock will be received by the rubber bumper block 40 and not transmitted to the body of the vehicle.

As shown in Fig. 4, a radially projecting annular flange 46 is provided at the base of the boss 45 to fit telescopically between the cover plate 35 and the inner hub member so that the working parts will be protected against dirt while the vertical movement of the hub members will be permitted. In this form of wheel, as in the previously described form, the outer hub rotates about the inner hub but in passing over irregularities in the road the two hub members will move vertically together, the driving arm moving relatively through the collar engaged by it and the springs returning the parts to normal position after the irregularity has been passed.

It is to be understood that although the driving arm is shown as extending entirely across the inner hub member, it may extend only across one half of the same and engage the outer hub at only one point if a lighter construction be desired. It is also to be understood that the inner hub in this form of wheel may be constructed with upper and lower webs and the resultant spaces as shown in Figs. 1 and 2, and either the plates 8 and 9 or the members 34, 35 and 46 may be employed as preferred.

Figure 8:
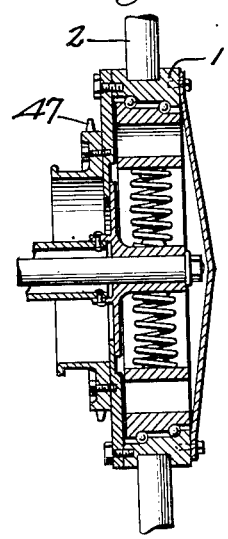
Fig. 8 is a transverse section of the wheel shown in Fig. 7.

If the device is to be applied to a chain driven wheel, the sprocket teeth 47 for engagement by the chain may be formed on the inner face of the wheel and will preferably be integral with the cover plate secured to the outer hub member. The brake rim may also be formed integral with the cover plate, as shown in Fig. 8.

Figure 9:
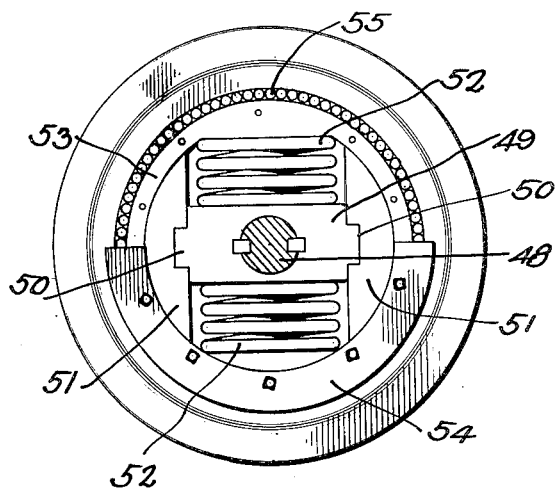
Fig. 9 is a view showing the manner of applying the invention to a car wheel.
Figure 10:
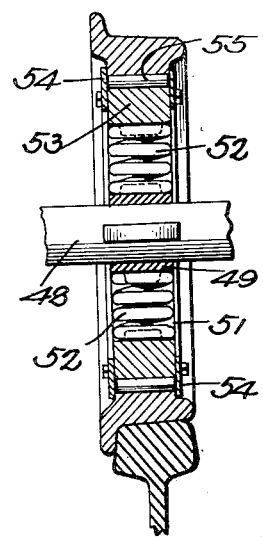
Fig. 10 is a transverse section of the car wheel.

If it be desired to apply the device to a car wheel, the axle 48 is fitted in the central bore of a block or rest 49 which has its upper and lower faces smooth and free of projections and is equipped at its ends with lugs or ears 50 to engage over the sides of the bumper blocks 51, rollers corresponding to the rollers 18 or 39 being provided if desired. Springs 52 are arranged between the upper and lower sides of the rest 49 and the upper and lower portions of the inner hub 53 shown in Figs. 9 and 10. Flange rings 54 may be secured to the inner hub member of the wheel and bridge the space between the same and the inner periphery of the outer hub as in Fig. 10, to retain anti-friction rollers 55 in position between the two hub members. The end of the axle may be shrunk or otherwise permanently secured to the rest 49 and a single large spring may be employed at the opposite sides of the rest instead of a plurality of smaller springs as in the forms previously described. In this form of wheel, the upper and lower sides of the rest are flat and in one plane throughout their respective areas.

In Fig. 5 I have shown an arrangement of three springs 56 below the rest 57 and two springs 58 above the rest. The upper springs 58 are smaller than the lower springs and are inclosed in casings 59 which also house pistons 60 resting on the springs and connected with the rest by piston rods 61. The pistons fit closely within the casings which are secured at their upper ends to the web 62 and have their lower ends spaced from the rest but fitting around the piston rods. I thus obtain a pneumatic dash pot action coöperating with the springs and can accommodate an oil cup 63 on the rest to furnish lubricant to a rotating axle.

A lock 64 may be secured in the space above the upper web of the inner hub member. The bolt 65 of this lock is arranged to pass through an opening 66 in the peripheral wall of the inner hub member and engage between the rollers 3 and enter a socket in the outer hub member so that the wheel cannot rotate and theft of the vehicle will be prevented.

Having thus described the invention, what is claimed as new is:

1. In a wheel, the combination of a central stationary rest, an axle passing through the rest, an inner hub member inclosing the rest and having chordal webs above and below the rest, cushion springs disposed between the rest and said chordal webs, cushion bumpers arranged between the corresponding ends of said webs and having vertical inner opposed faces with which the ends of the rest have sliding engagement, and an outer hub member mounted for rotation about the inner hub member.

2. The combination of a stationary rest, an inner hub member disposed concentrically around said rest, shock-absorbing devices between the rest and the said hub member, an outer hub member rotatably fitted about the inner hub member, a guide on the outer face of the outer hub member, and a driving arm secured to the axle and engaging in said guide and playing through the same as the hub members move vertically relative to the axle.

3. The combination of an axle, a rest through which the axle passes, an inner hub member disposed around the rest, shock-absorbing devices between the rest and the inner hub member, an outer hub member rotatably fitted upon the inner hub member, a guide upon the outer hub member, a driving arm secured upon the axle and extending to the outer hub member, and yieldable devices on the outer hub member in engagement with the driving arm.

4. The combination of an axle, a rest through which the axle passes, an inner hub member disposed around the rest, shock-absorbing devices between the rest and the inner hub member, an outer hub member mounted to rotate upon the inner hub member, a guide on said outer hub member, a driving arm secured to the axle and engaging in said guide, and spring pressed pins mounted on the outer hub member and bearing against the opposite edges of the driving arm.

In testimony whereof I affix my signature.

ANDREW L. CARROLL. [L. S.]